United States Patent [19]
Shen et al.

[11] Patent Number: 6,081,363
[45] Date of Patent: Jun. 27, 2000

[54] OPTICAL LENGTH ADJUSTING DEVICE

[75] Inventors: Christopher Shen; Harn-Jou Yeh, both of Hsinchu, Taiwan

[73] Assignee: Microtek International, Inc., Hsinchu, Taiwan

[21] Appl. No.: 09/198,468

[22] Filed: Nov. 24, 1998

[30] Foreign Application Priority Data

Jul. 9, 1998 [TW] Taiwan .................................. 87211048

[51] Int. Cl.⁷ .................................................. G02B 26/08
[52] U.S. Cl. ............................ 359/196; 359/223; 355/60; 355/67; 399/200; 399/202
[58] Field of Search ..................... 359/196, 223; 355/51, 60, 66, 67; 399/200, 201, 202

[56] References Cited

U.S. PATENT DOCUMENTS

| | | | |
|---|---|---|---|
| 4,774,547 | 9/1988 | Uchida et al. ............................ | 355/27 |
| 5,559,585 | 9/1996 | Takagi ...................................... | 399/178 |
| 5,822,082 | 10/1998 | Sato ......................................... | 358/401 |

*Primary Examiner*—Darren E. Schuberg
*Attorney, Agent, or Firm*—Bacon & Thomas, PLLC

[57] ABSTRACT

An optical length adjusting device provides different optical length for different lenses in a multi-resolution scanner. The optical length adjusting device includes a focus module for focusing the optical image on an image sensor, a first light reflecting device for directing the light from an object to the focus module, a first carrier for fixing the first light reflecting device, a second carrier for fixing the focus module, and a driving module for moving the first and/or second carriers to change the distance between them. Since the distance between the focus module and the first light reflecting module can be adjusted, the light from the object can be guided to the focus module via the same optical path for different resolution.

8 Claims, 5 Drawing Sheets

OPTICAL LENGTH ADJUSTING DEVICE

BACKGROUND OF THE INVENTION

The present invention relates to an optical length adjusting device, and more particularly to an optical length adjusting device which is used in a scanner for adjusting the focus for multiple resolutions.

Along with the popularization of personal computers (PC), various models of peripheral appliances have been put on the market, and the demand has been on the rise. One of the examples is the optical scanner. Optical scanners are used to capture and digitize images and have different types to meet the market demand for different users. When a scanner is operated in high resolution, it can capture a higher quality image, but its scanning view will be smaller and its scanning speed will be slower than one operated at low resolution. However, users do not always require the finest high-resolution scanning process at all times, therefore, with the consideration of cost and utility, a scanner with high/low resolution has been introduced.

In other words, under the condition of not increasing the amount of the sensor pixel of a CCD, when a user requires high-resolution scanning, the area being scanned is limited to a smaller area and focused by a first image lens to a CCD; conversely, when a low-resolution scanning is required, a second image lens will be used to focus a larger area of the scanned image to project it to the CCD. However, since the focuses of the first and second lenses are different, and also the distances between the scanned object and the focusing lens, therefore, two sets of optical paths for different optical lengths shall be required, as in the prior art shown in FIGS. 1 and 2. This prior art was disclosed in U.S. Pat. No. 5,705,805 issued on Jan. 6, 1998.

As shown in FIG. 1, when a scanned image is projected from the position 80, it is reflected by mirrors 74, 76, 72 and 70 and into a focusing lens 62 to form a first path and optical length 152 between the position 80 and the focusing lens 62. As shown in FIG. 2, when said scanned image is projected from the position 80, it is reflected by mirrors 74, 72 and 70 and into the focusing lens 64 to form a second path and optical length 158 between the position 80 and the focusing lens 64. This second path does not travel via the mirror 76, and it is achieved by rotating the angle of the mirror 74.

However, the prior art employs two optical paths to accomplish the objective of different optical paths to suit different lenses. The intention is to combine the two high/low resolution optical paths and align them with the axis of the lens. Therefore, in case there is any deviation from the combination of the two high/low resolution optical paths, it will influence the quality of the image. On the other hand, since it requires numerous components for forming the two types of optical lengths and paths, especially when assembling in a limited space, there could be error in the combination due to sophisticated assembling processes, which could influence the quality of image. To reduce the number of components, we may use a movable reflecting mirror. However, the driving mechanism will become more sophisticated, if it meets different demands of reflecting documents and transmissive documents by incorporating other optical paths. Therefore, to meet the trend of high/low resolution scanning capabilities, and the design of a various-type documents scanning mechanism, there is a need for a unit equipped with a minimum number of optical components to achieve the purpose of adjusting optical length.

SUMMARY OF THE INVENTION

It is therefore a primary objective of the present invention to provide an optical length adjusting device with a single optical path to achieve at least two optical lengths. Another objective is to provide an optical length adjusting device with the additional automatic focus function.

To achieve the above objective, the present invention of optical length adjusting device comprises: a focusing module for focusing an optical image on an image sensor, a first light reflective module for reflecting the optical image delivered from a scanned object to the focusing module for forming an optical length between the scanned object and the focusing module, a first carrier for fixing the first light reflective module, a second carrier for the fixing the focusing module, and a driving module to move the relative positions of the first and second carriers to correspond to one of the first position of the first optical length and the second position of the second optical length.

According to the above construction, since the focusing module and the light reflecting module are located on the first and second carriers, when the driving module changes the relative distance between the first and second carriers, the optical length in a same optical path between the scanned object and the focusing device shall be varied. Thus, it can achieve the change of optical length in a same optical path.

Furthermore, since the number of components, such as reflecting mirrors, used in the optical image transmission device, is reduced, it will reduce various costs required for manual adjustment of different optical paths. Furthermore, since the focusing module can be moved in relation to the light reflective module, the existing mechanism can achieve more precise focus by employing various automatic focusing methods.

DETAILED DESCRIPTION OF PREFERRED EMBODIMENT

Figure 1:
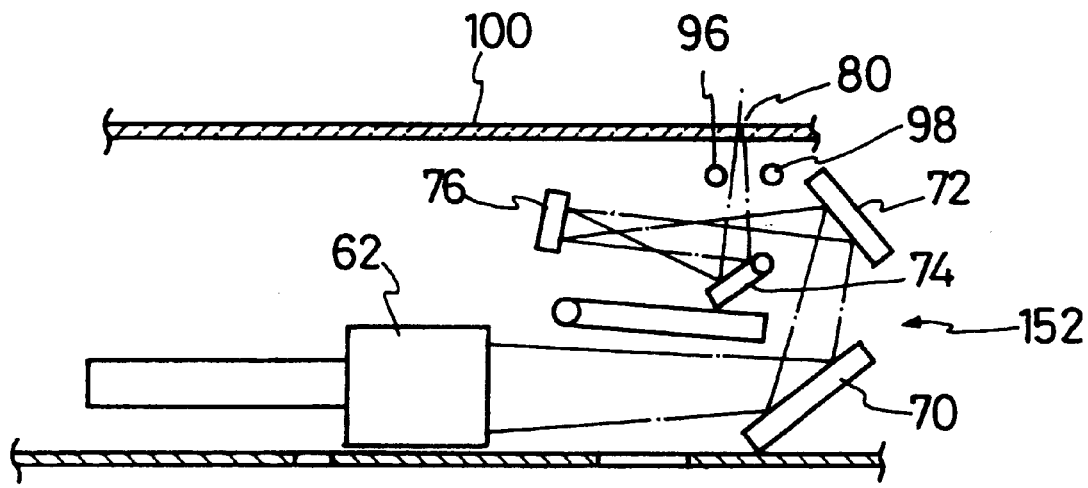
FIG. 1 is a section view of a prior art of optical scanner when it is applied to a first optical pathway.
Figure 2:
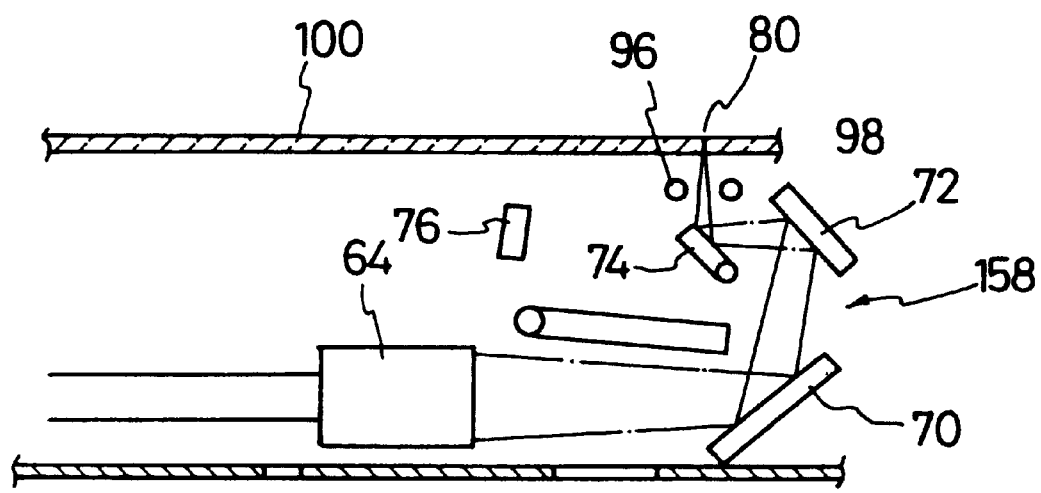
FIG. 2 is a section view of a prior art of optical scanner when it is applied to a second optical pathway.
Figure 3:
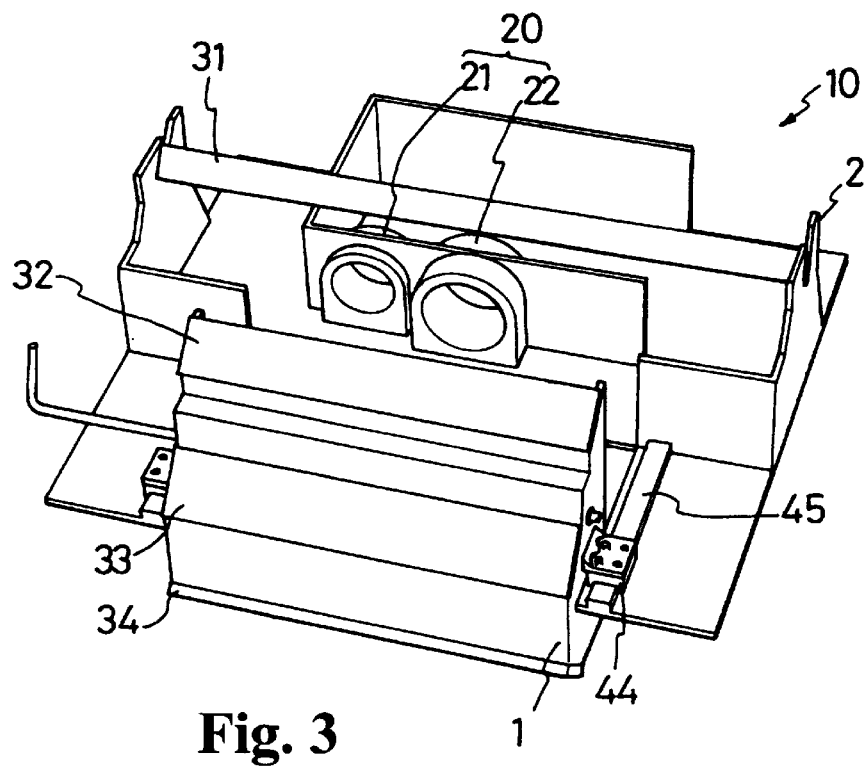
FIG. 3 is a perspective view of an optical module configured according to preferred embodiment of the present invention.
Figure 4:
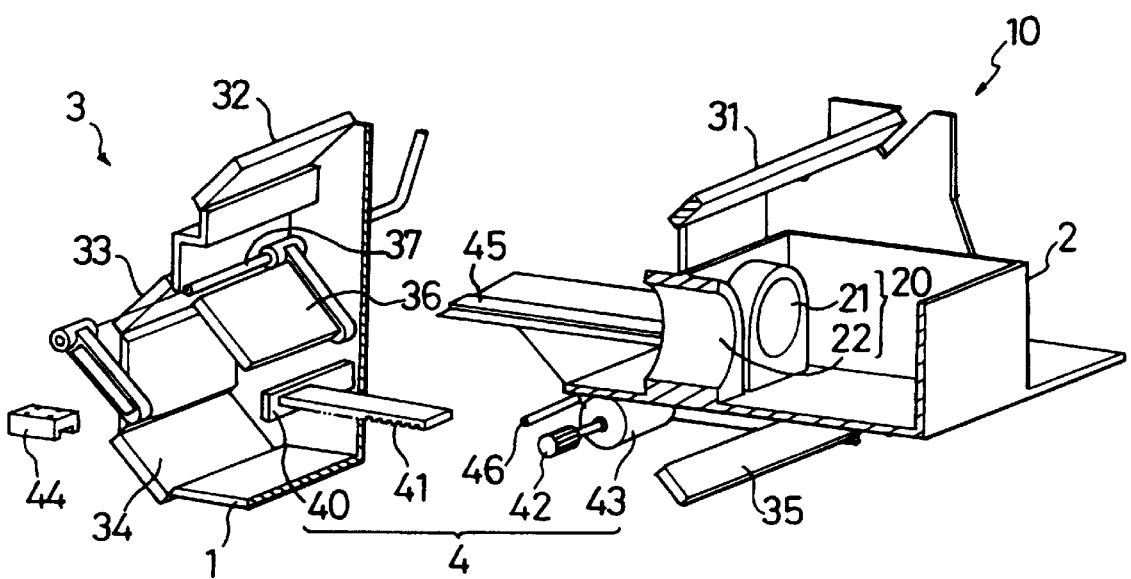
FIG. 4 is a partially disassembled view of the optical module shown in FIG. 3.

FIGS. 3 to 9 illustrate the preferred embodiment configured according the present invention. FIG. 3 is a perspective view of an optical module configured according to a preferred embodiment of the present invention, while FIG. 4 is a partially disassembled view of the preferred embodiment shown in FIG. 3. The above drawings relate to a type of scanner with two optical paths that are applied respectively to the reflective scanning and transmissive scanning, as well as to high/low-resolution scanning purposes.

As shown in FIGS. 3 and 4, the optical module 10 comprises a focusing device 20 having two lens 21 and 22, a first light reflective device 3 which has reflecting mirrors 32, 33, 34 and 36, and a second light reflective device 3a which has reflective mirrors 31 and 35. The optical module 10 further comprises a first carrier 1 onto which the first light reflective device 3 is fixed, and a second carrier 2 onto which the second light reflective device 3a and the focusing device 20 are fixed. The optical module 10 further comprises a driving device 4. The driving device 4 has a motor 43 fixed at the second carrier 2, a rack 42 fixed at the motor shaft, a rack 41 fixed at the first carrier 1, a slide block 44 connected with a recess in the first carrier 1, and a guide track 45 fixed to the second carrier and to match with the recess of said slide block 44.

The focusing lens 21 and 22 of the focusing device 20 are employed to focus image light during high and low resolution scanning, respectively. In other words, the focusing lens 21 has a smaller incident area, applicable to the scanning of high-resolution images, while the focusing lens 22 has a larger incident area, applicable to the scanning of low-resolution images. Basically, the optical axes of these two lens 21 and 22 are approximately parallel to each other, with approximately horizontal incident areas, and the incident image area included in the lens 21 is located at the center of the incident image area included in the lens 22.

The reflective mirrors 32,33,34 of the first light reflective device 3 are fixed to the outside wall of the first carrier 1 at appropriate angles. The reflecting mirror 36 is fixed to a shaft 37 at the first carrier 1 and is controlled and driven by a control unit (not shown in drawing) to swing movably at two positions along the shaft 37. The reflective mirrors 32 and 36 serve to guide the optical image produced from scanning the reflective document, while the reflecting mirrors 33 and 34 serve to guide the optical image produced from scanning the transmissive documents.

The reflective mirrors 31 and 35 of the second light reflective device 3a are fitted to the upper and lower sides of the second carrier 2 at appropriate angles, respectively. The reflective mirror 31 serves to reflect an optical image produced from the reflective document to mirror 32, while the reflective mirror 35 serves to reflect an optical image produced from the transmissive documents to mirror 34.

The rack 41 at the driving device 4 is fixed to the first carrier 1 by means of a cross bar 40. After the first carrier 1 and the second carrier 2 are assembled, the rack 41 is squeezed between a roller 46 fixed to the second carrier 2 and a rack 42 fixed to the motor shaft and is toothed with the rack 42. When the motor 43 on the second carrier 2 is controlled by a control unit (not shown) to turn either in the forward or reversed direction, the rack 41 will drive the first carrier 1 to move toward to or away from the second carrier 2. Therefore, the first light reflective device 3 at the first carrier 1 also moves toward to or away from the focusing device 20 on the second carrier 2 at the same time. The motor 43 mentioned above may be a conventional applicable motor, such as a stepping DC motor.

Figure 5:
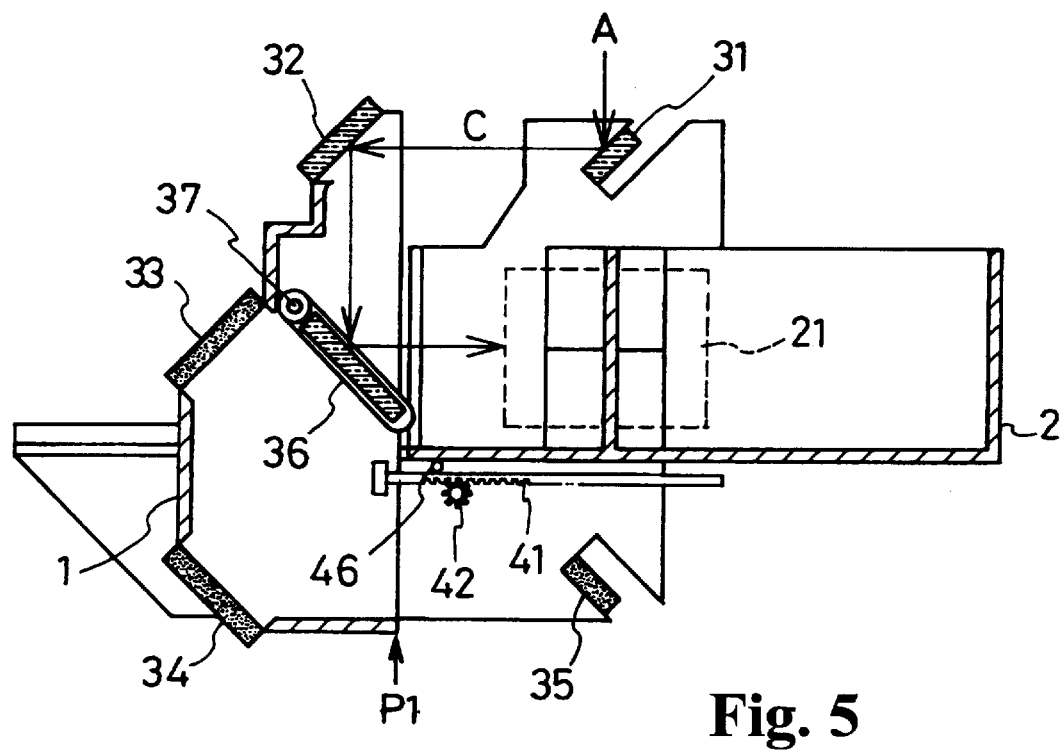
FIG. 5 is a sectional view of the optical module as shown in FIG. 3, with the application of reflective scanning at the first position.

How the optical pathway is changed by said optical module 10 will be described below. As shown in FIGS. 5, 6, 7 and 8, the arrows indicate the travelling directions of optical images. FIG. 5 illustrates the optical pathway C and optical length of a reflective document under a high-resolution scanning process. The first carrier 1 is located at a first position P1. When the image A produced from projecting light on a reflective document is projected to the reflective mirror 31 at the second light reflective device 3a, it is reflected to the reflective lens 32 in the first light reflective device 3. Then it is reflected by the reflective mirror 36 and into the focusing lens 21, wherein its optical length is equivalent to the distance from the image A of the document to the lens 21.

Figure 6:
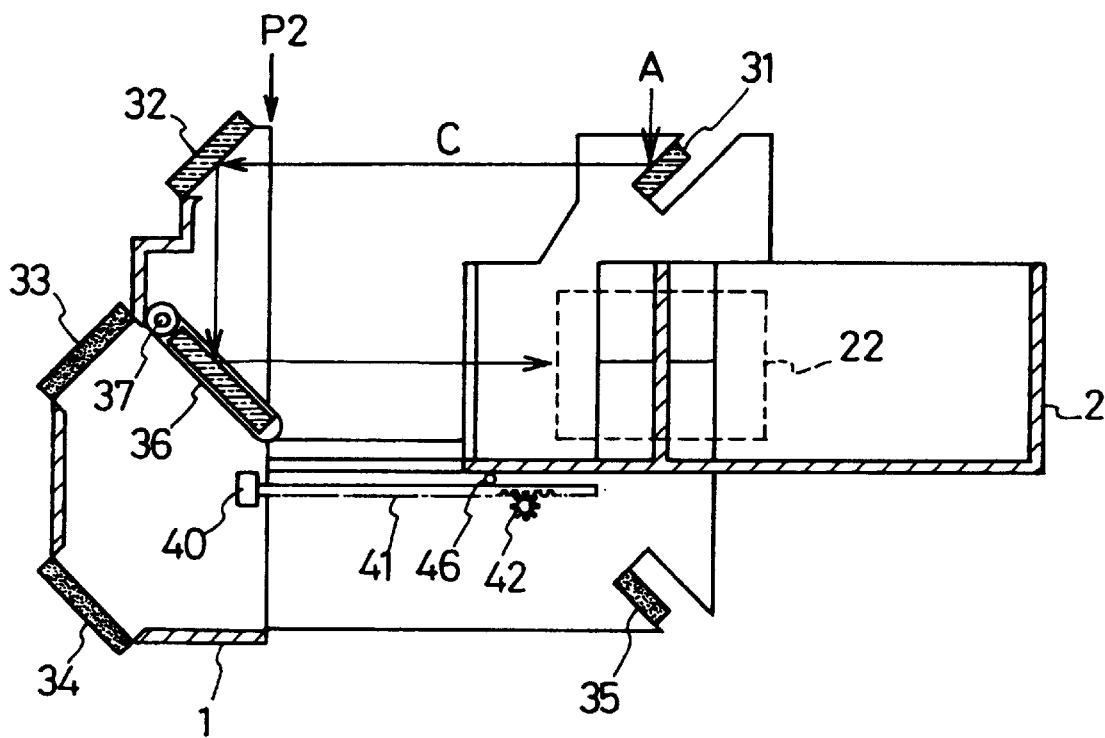
FIG. 6 is a sectional view of the optical module as shown in FIG. 3, with the application of reflective scanning at the second position.

FIG. 6 illustrates the optical pathway C and optical length of a reflective document in a low-resolution scanning process. In this case, the first carrier 1 is moved to a second position P2 by the driving device 4. As shown in the drawing, although the optical pathway C is the same as shown in FIG. 5, the distances between the reflective mirrors 31 and 32 and the distance between the reflective mirror 36 and the lens 21 are different from those shown in FIG. 5. Hence, the optical length of this optical pathway is different from the optical length of the optical pathway C shown in FIG. 5.

Figure 7:
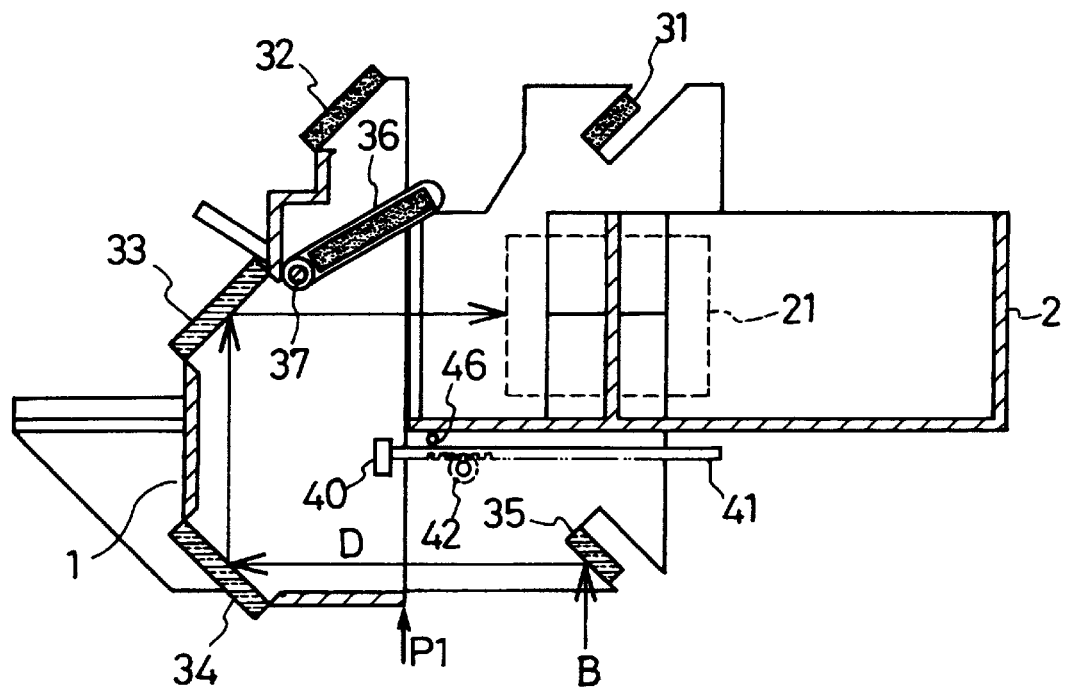
FIG. 7 is a sectional view of the optical module as shown in FIG. 3, with the application of a transmissive scanning at the first position.

FIG. 7 illustrates the optical pathway D and optical length of a transmissive document in a high-resolution scanning process. The first carrier 1 is located at a first position P1. When the image B produced from projecting light on a transmissive document is projected to the reflecting mirror 35 in the second light reflective device 3a, it is reflected to the reflective mirror 34 in the optical light reflective device 3. Then it is reflected by the reflective mirror 33, and into the focusing lens 22. Its optical length is equivalent to the distance between the image B of the document to the lens 22. Besides, as shown in FIG. 7, the reflective mirror 36 used for the reflective scanning mode is moved to the top position, where it will not obstruct the optical pathway D in such a scanning mode. According to this design, the axis of said focusing lens does not have to be changed either in the reflective scanning mode or transmissive scanning mode.

Figure 8:
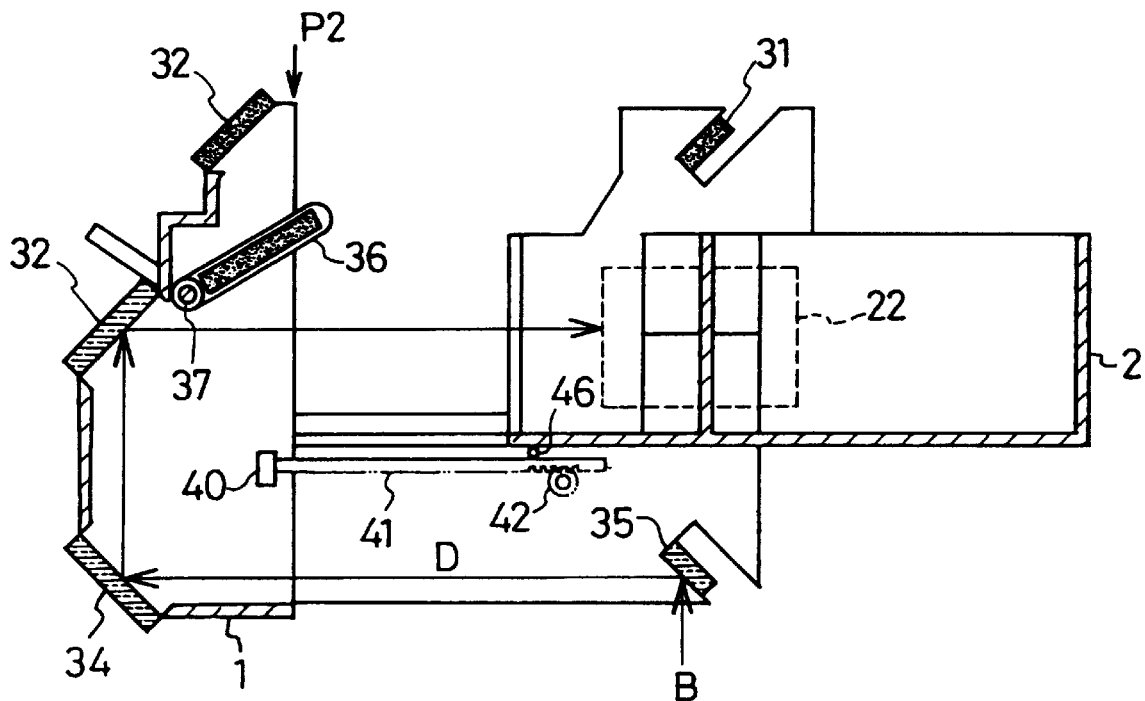
FIG. 8 is a sectional view of the optical module as shown in FIG. 3, with the application of a transmissive scanning at the second position.

FIG. 8 illustrates the optical path D and optical length of a reflecting document at a low-resolution scanning process. In this case, said first carrier 1 is moved to a second position P2 by the driving device 4. Although its optical path is the same as the optical path D shown in FIG. 7, the distance between the reflective mirror 35 and mirror 34 and the distance between the reflective mirror 33 and the lens 22 are different from those shown in FIG. 7. Therefore, the optical length of this optical path is different from the optical length of the optical path shown in FIG. 7.

By means of the above mentioned optical module, it is obvious that the present invention does not need to turn any mirror to change high/low resolution in the case of single scanning reflective or transmissive mode. Furthermore, even in the case of combined scanning modes of both reflective type and transmissive type as mentioned above in the embodiment, the precision of its integral control can be enhanced due to less frequent use of the movable mirror than in a conventional technology.

Figure 9:
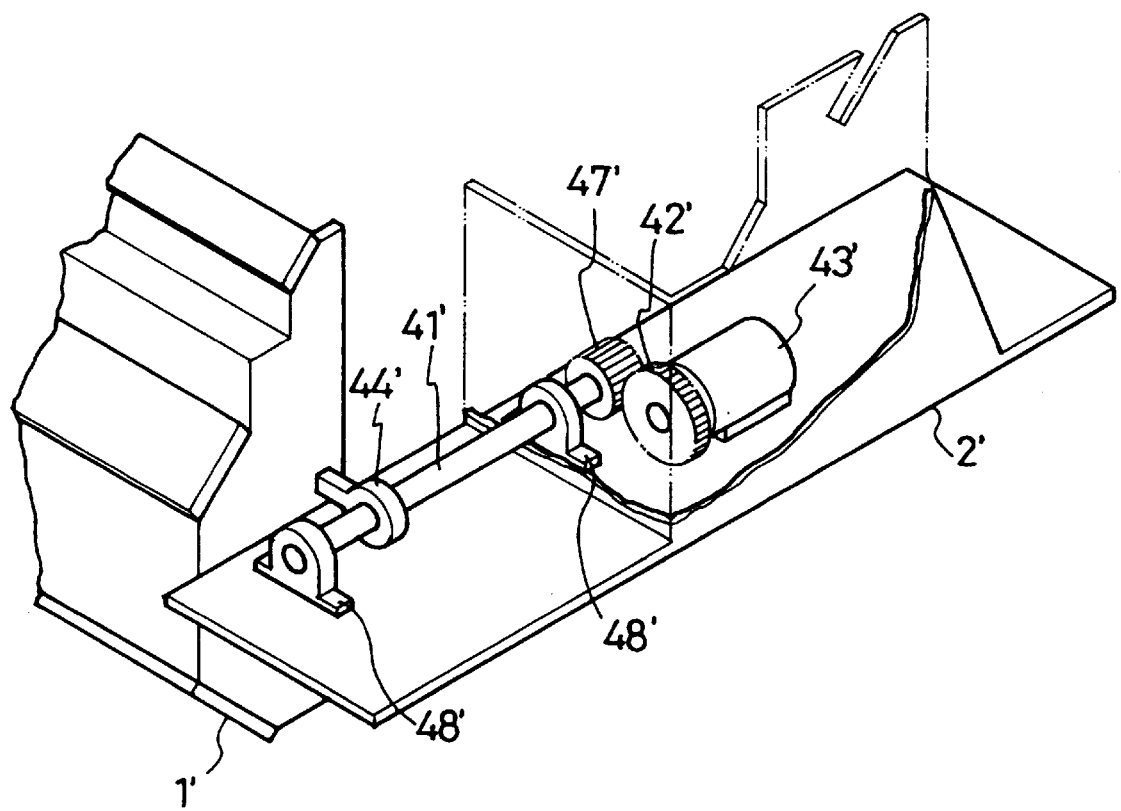
FIG. 9 illustrates another embodiment view according to the displacement device disclosed in the subject matter.

FIG. 9 illustrates another embodiment of the driving device configured according to the present invention. As shown in the drawings, the driving device 4 has a motor 43, a gear 42 fixed to the motor shaft, a roller bolt 41 movably fixed to the second carrier 2 through a bearing 48, and a nut 44 connected to the first carrier 1. And, preferably, to obtain balance and smooth movement, on the other side of the first and second carriers 1 and 2 (not shown) are a slide block 44 and a guide track 45 as in the previous embodiment. In this embodiment, when the control unit (not shown in drawing) activates the motor 43, it will drive the first carrier 1 to move toward or away from the second carrier 2.

Besides, since the present invention employs a driving device 4,4 to change the optical length of a scanned image to the focusing lens, the control unit may combine with any one automatic focusing method, so that appropriate control can be effected on the motor in the driving device. When the first carrier 1,1 is moved to the first or second position, the existing mechanism will proceed with various control and driving on all focusing methods, process fine adjustment, and obtain a maximum focusing effect.

Although the preferred embodiment of the subject matter has been cited and described above, those skilled in the art will appreciate that all equivalent modifications shall be included in the intent of the subject claims.

For example, in the above embodiment, though the focusing device 20 is described in the case of two lenses with different foci-, but the same effect can be obtained by a focusing lens that may be moving between two fixed points. Besides, in the above embodiment, though there is an additional second optical image transmission device 3a on the second carrier 2 (such as the reflective mirrors 31, 35), quite obviously, the optical image of the scanned object may be received directly by the first optical image transmission device 3, and, after a changing process, projected to the focusing lens 20 on the second carrier 2.

Furthermore, though the above mentioned optical path transmission device has included the reflecting lenses as its essential components, quite obviously, specific optical paths may also be obtained by employing the lens with refractive effect at appropriate fixed angles, such as the lens 31 or 32 to receive the optical images of a scanned object, to achieve the purpose of using a prism to change its position angles.

Furthermore, in addition to the above mentioned combination of racks and gears for the application of the displacement device, and the use of roller bolt, the coordination of a timing belt and a pulley can be used to achieve the displacement of the first carrier. Besides, in the embodiment mentioned, though the motor is installed on the second carrier, it may also be installed on the first carrier, and besides, if only there is relative movement on the first carrier and the second carrier, the motor may also be installed on the main frame of the first and the second carriers, for individual control of the movement of the first carrier or the second carrier. Furthermore, by coordinating the detection and installation of conventional fixing points, the first and the second carriers will be able to achieve specifically exact positions.

Therefore, the intent of the subject claims shall not be limited by the above cited examples of embodiment, but shall be limited by the following claims.

What is claimed is:

1. An optical length adjusting device, comprising:

a focus module for focusing an optical image on an image sensor;

a first light reflecting module for directing light from a scanned object to said focus module;

a first carrier for fixing said first light reflecting module;

a second carrier for fixing said focus module; and a driving module for changing the relative distance between said focus module and said first light reflecting module, wherein said second carrier further includes a second light reflecting module for directing the light from the scanned object to said first light reflecting module.

2. An optical length adjusting device as claimed in claim 1, wherein said focus module has two lenses with different foci.

3. An optical length adjusting device as claimed in claim 1, wherein said focus module has a zoom lens with at least two foci.

4. An optical length adjusting device as claimed in claim 1, wherein one of the first components or second components includes a movable mirror arranged to selectively reflect the light from the reflective object or the transmissive object to said focus module.

5. An optical length adjusting device 1, comprising:

a focus module for focusing an optical image on an image sensor;

a first light reflecting module for directing light from a scanned object to said focus module;

a first carrier for fixing said first light reflecting module;

a second carrier for fixing said focus module; and a driving module for changing the relative distance between said focus module and said first light reflecting module, wherein said first light reflective module includes first optical components arranged to form a first optical path for reflecting light from a reflective object and second optical components arranged to form a second optical path for reflecting light from a transmissive object.

6. An optical length adjusting device as claimed in claim 5, wherein said second light reflecting module includes third optical components arranged to reflect the light from the reflective object to said first optical components and fourth optical components arranged to reflect the light from the transmissive object to said second optical components.

7. An optical length adjusting device as claimed in claim 5, wherein said focus module has two lenses with different foci.

8. An optical length adjusting device as claimed in claim 5, wherein said focus module has a zoom lens with at least two foci.

* * * * *